United States Patent
Walter

(12) 
(10) Patent No.: US 8,388,004 B2
(45) Date of Patent: Mar. 5, 2013

(54) PERSONAL TRANSPORTATION DEVICE

(76) Inventor: Edward Walter, Coronado, CA (US)

( * ) Notice: Subject to any disclaimer, the term of this patent is extended or adjusted under 35 U.S.C. 154(b) by 319 days.

(21) Appl. No.: 12/778,465

(22) Filed: May 12, 2010

(65) Prior Publication Data

US 2011/0278814 A1 Nov. 17, 2011

(51) Int. Cl.
*B62M 1/16* (2006.01)
(52) U.S. Cl. ......... 280/248; 280/244; 280/250; 280/282
(58) Field of Classification Search .............. 280/242.1, 280/244, 245, 246, 247, 248, 249, 250
See application file for complete search history.

(56) References Cited

U.S. PATENT DOCUMENTS

| | | | |
|---|---|---|---|
| 368,167 A | 8/1887 | Powell | |
| 380,770 A | 4/1888 | Schiermeyer | |
| 439,382 A | 10/1890 | Bryden | |
| 647,480 A | 4/1900 | Damour | |
| 3,149,857 A | 9/1964 | May | |
| 3,909,043 A * | 9/1975 | Black | 280/269 |
| 4,170,271 A | 10/1979 | Looker | |
| 4,515,362 A | 5/1985 | Lin | |
| 4,548,420 A * | 10/1985 | Patroni, Jr. | 280/224 |
| 4,584,889 A * | 4/1986 | Patroni, Jr. | 74/49 |
| 5,282,640 A * | 2/1994 | Lindsey | 280/234 |
| 5,288,092 A | 2/1994 | Miller et al. | |
| 5,997,020 A * | 12/1999 | Borg | 280/243 |
| 7,077,415 B2 * | 7/2006 | Ikeda et al. | 280/246 |
| 7,360,780 B1 * | 4/2008 | Tucker | 280/244 |
| 7,967,313 B1 * | 6/2011 | Eggert | 280/224 |
| 2009/0058034 A1 * | 3/2009 | Leslie | 280/250 |
| 2010/0044995 A1 * | 2/2010 | Park | 280/246 |

OTHER PUBLICATIONS

Website page from www.elliptigo.com entitled "ElliptiGO 8S", May 3, 2010.

* cited by examiner

*Primary Examiner* — Kevin Hurley
(74) *Attorney, Agent, or Firm* — Eric L. Lane; McKenna Long & Aldridge LLP

(57) ABSTRACT

A personal transportation device comprises a riding platform supported by one or more wheels, a steering mechanism at least partially embedded in the riding platform and a drive wheel assembly. A first wheel may be steerable while a second wheel is a slave wheel. The steering mechanism may be foot-operated. The drive wheel may be hand-propelled and non-steerable. The drive wheel is operatively connected to a drive sprocket and chain and is coupled to the riding platform by a platform frame. The personal transportation device may comprise one or more track arm assemblies coupled to the drive wheel assembly such that movement of the track arm assemblies operates the drive wheel assembly and rotates a drive wheel to propel the vehicle.

17 Claims, 18 Drawing Sheets

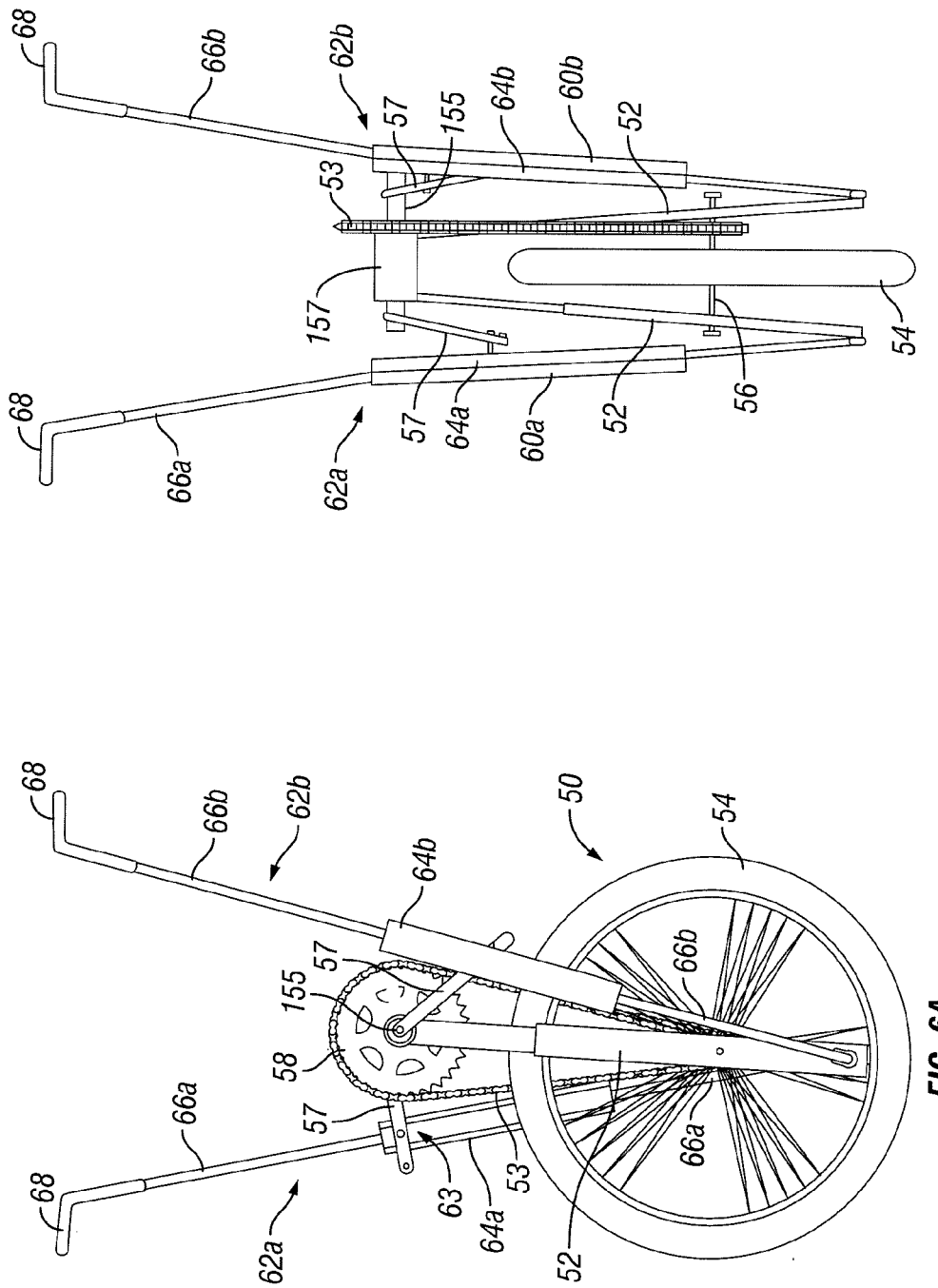

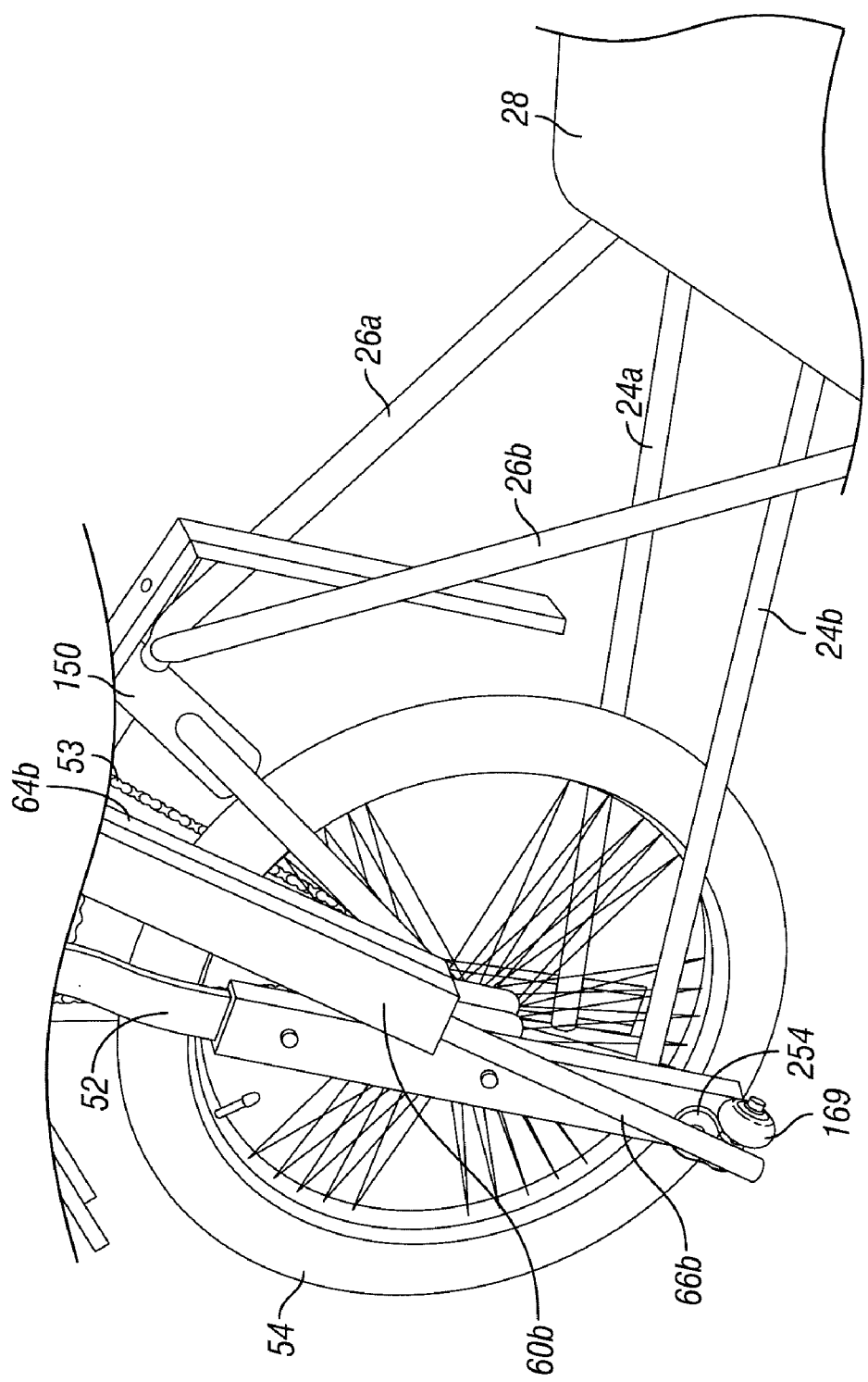

PERSONAL TRANSPORTATION DEVICE

FIELD OF THE INVENTION

The present invention is generally directed to a vehicle that may be used for personal transport and/or exercise purposes.

BACKGROUND OF THE INVENTION

Regular exercise is very important for maintaining one's physical health. Yet for many people, the basic forms of exercise such as walking, jogging or using exercise machines at a gym or fitness club are tedious and boring. Walking and jogging rarely provide any fun or excitement, and working out at a fitness club does not allow an individual to enjoy outdoor scenery. Though cycling is popular, there is little upper body movement or arm and chest exercise involved.

In addition, people are increasingly seeking environmentally friendly personal transportation options for short commutes to work and local leisure travel. Bicycles are popular zero-emission personal transportation devices, but are not appealing to many people for various reasons. Some people don't feel safe riding bicycles because they are not permitted on the sidewalks and must be ridden in heavy automobile traffic. Others simply do not like the required pedaling motion. In addition, some people feel uncomfortable on bicycles because they do not have sufficiently good balance to remain upright on a two-wheeled vehicle.

In view of the above, there exists a need for an exercise apparatus that can be enjoyed outdoors and is fun to operate. There is also a need for an outdoor exercise apparatus that provides an upper body workout. There is an additional need for an environmentally friendly personal transportation device that does not require pedaling and may be ridden on the sidewalk. There exists a need for a zero-emission personal transportation device with more than two wheels so it does not require balance to ride safely. In sum, there exists a need for an environmentally friendly vehicle system that can be used for both outdoor exercise and transport purposes and is safe, easy to use and fun to ride.

SUMMARY OF THE INVENTION

In view of the foregoing, it is an object of the present invention to provide an exercise apparatus that is fun and easy to use.

It is another object of the invention to provide an exercise apparatus that can be used outside and has more than two wheels so that it does not require the user to balance the apparatus.

It is another object of the invention to provide an outdoor exercise apparatus that does not require pedaling and provides an upper body workout.

It is an object of the invention to provide a personal transportation device that is environmentally friendly and can be ridden on the sidewalk. It is another object of the invention to provide a self-propelled vehicle with more than two wheels so it does not require the user to balance the vehicle during use.

It is an object of the invention to provide an environmentally friendly vehicle system that can be used for both outdoor exercise and transport purposes and is safe, easy to use and fun to ride.

Embodiments of an exercise apparatus in accordance with the present invention comprise a riding platform supported by at least two wheels. The first wheel is steerable, and the second wheel is a slave wheel. A steering mechanism is coupled to the riding platform and may be at least partially embedded therein. The exercise apparatus further comprises a single non-steerable drive wheel operatively connected to a drive sprocket and chain and coupled to the riding platform by a platform frame.

Further embodiments of a personal transportation device comprise a riding platform supported by one or more wheels, a foot-operated steering mechanism embedded in the riding platform and a hand-propelled single non-steerable drive wheel. The drive wheel is operatively connected to a drive sprocket and chain and is coupled to the riding platform by a platform frame.

Embodiments of a self-propelled vehicle comprise a platform assembly, one or more wheel assemblies, a drive wheel assembly and one or more track arm assemblies to operate the drive wheel assembly. The platform assembly has a platform and a steering mechanism coupled to the platform. The steering mechanism includes a user interface accessible from a top surface of the platform and a turning assembly accessible from a bottom surface of the platform. The user interface may be a substantially round disk so the steering mechanism may be foot-operated. The steering mechanism may have a lazy susan-type cabinet bearing. The turning assembly may have an interlocking gear and chain component. Each wheel assembly has a wheel, and at least one wheel assembly is operatively connected to the gear so that the wheel is turnable by manipulating the user interface of the steering mechanism. The vehicle may have two wheel assemblies with a first wheel assembly having a steerable wheel and a second wheel assembly having a slave wheel.

The drive wheel assembly includes a drive wheel operatively connected to a drive sprocket and chain. Embodiments could have one sprocket for a single speed vehicle or multiple sprockets to allow for multiple speeds and resistance variations. In some embodiments, the drive wheel is fixed and non-steerable. The drive wheel assembly is coupled to the platform assembly by a platform frame. The track arm assemblies are coupled to a drive wheel frame such that movement of the track arm assemblies operates the drive wheel assembly and rotates the drive wheel to propel the vehicle. The track arm assemblies may be hand operated and have gripping handles for ease of use. In an exemplary embodiment, each track arm assembly comprises a track extending partially along its length.

Embodiments of a self-propelled vehicle may also include two crank arms. Each crank arm is pivotally coupled to the drive sprocket at a first end and movably coupled to a respective track at a second end via a roller disposed within a channel of the track. The one or more track arm assemblies also may comprise a track arm frame member. The track arm frame member has a top and bottom portion, and the drive wheel frame is pivotally coupled to the bottom portion of the track arm frame member at a first end and pivotally coupled to the drive sprocket and a crank arm at its second end.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 6A is a side view of an embodiment of a pair of track arms in accordance with the present invention;

FIG. 6B is a front view of an embodiment of a pair of track arms in accordance with the present invention;

FIG. 11 is a perspective view of an embodiment of a platform frame in accordance with the present invention;

DETAILED DESCRIPTION

In the following paragraphs, the present invention will be described in detail by way of example with reference to the attached drawings. Throughout this description, the embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
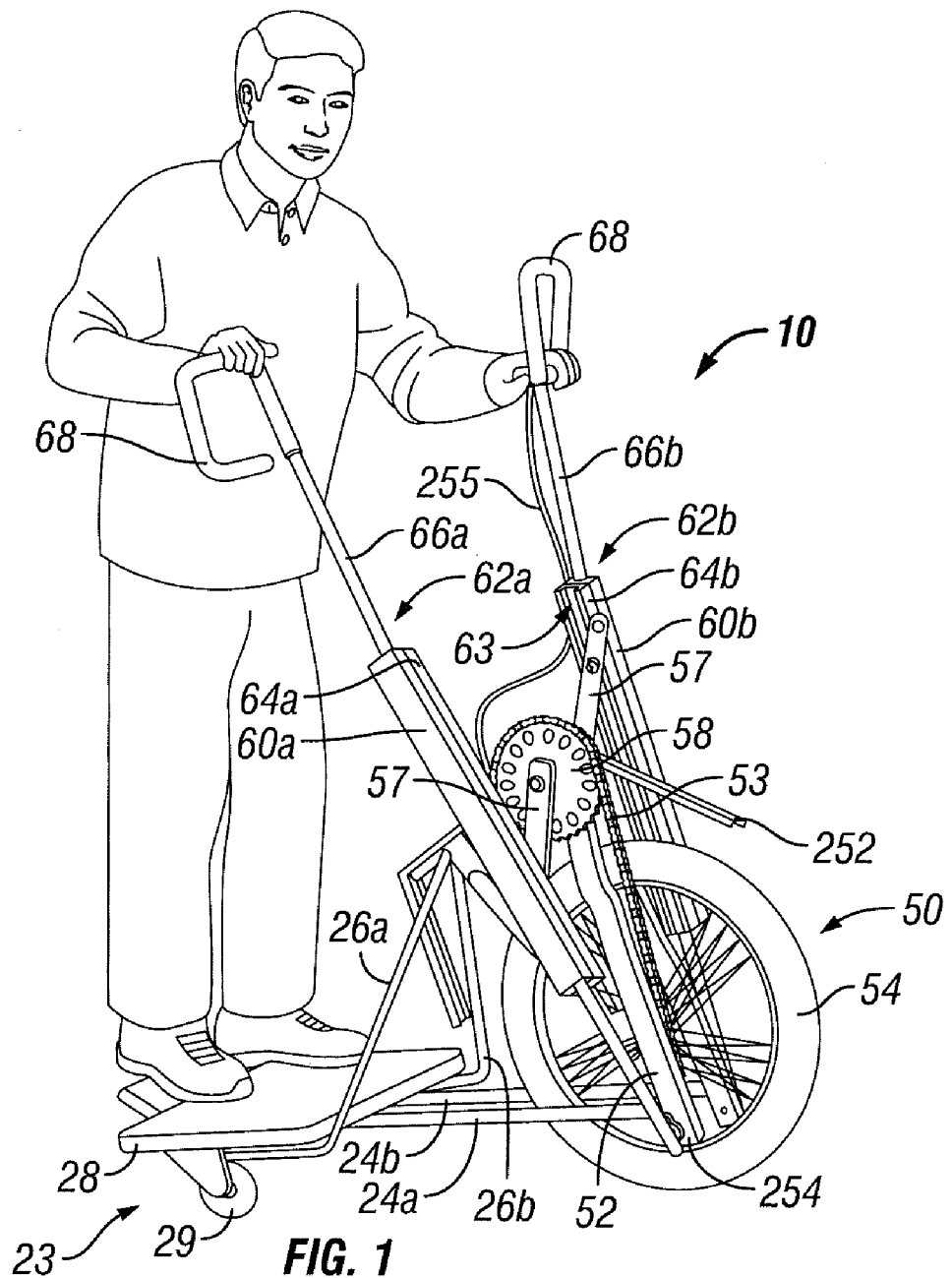
FIG. 1 is a perspective view of an embodiment of a personal transportation device in accordance with the present invention.
Figure 2:
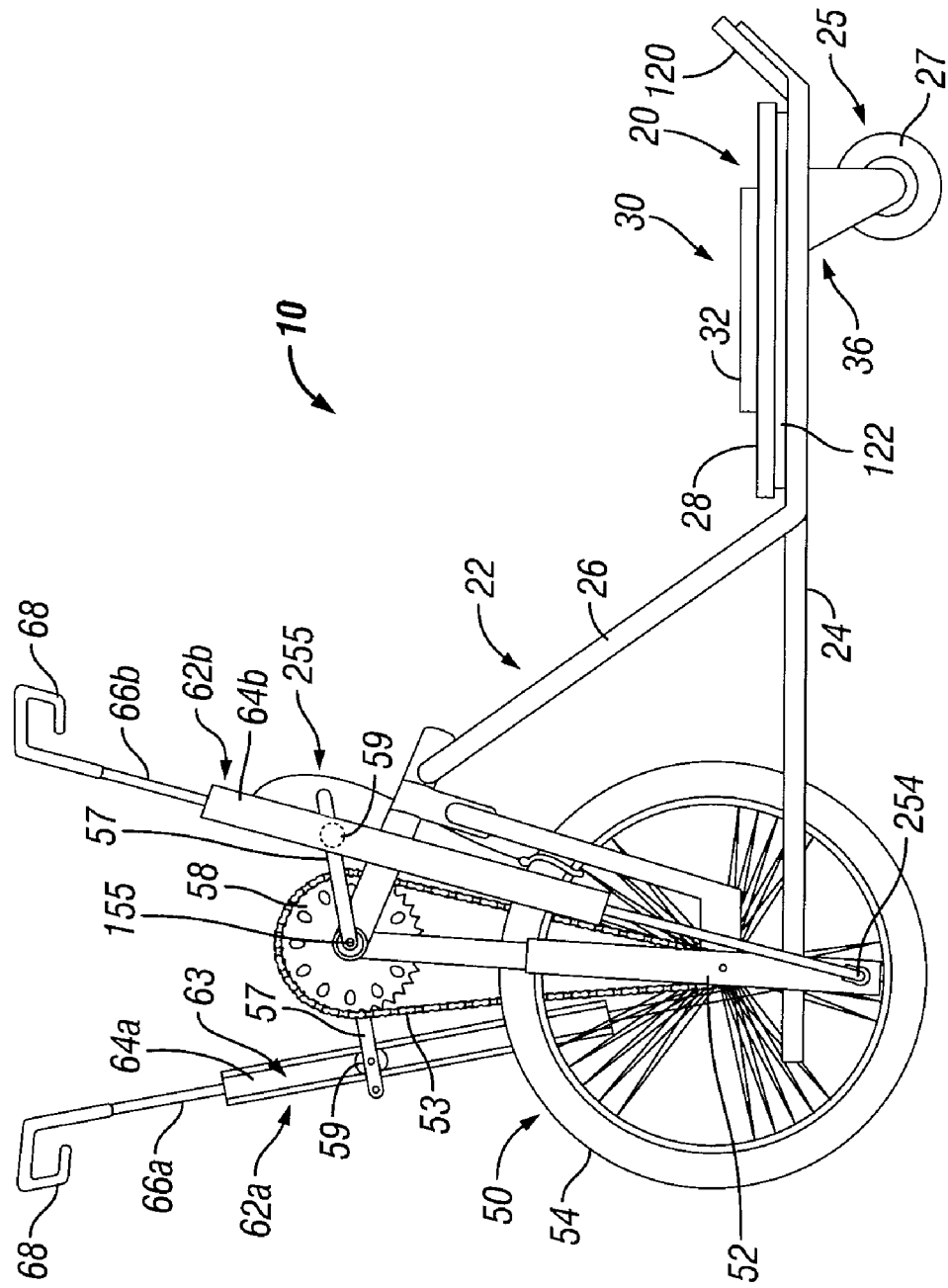
FIG. 2 is a side view of an embodiment of a personal transportation device in accordance with the present invention.

Referring first to FIGS. 1 and 2, an embodiment of a personal transportation device will be described. In the present disclosure, the terms "personal transportation device," "hand-propelled vehicle" and "exercise apparatus" will be used interchangeably. It should be noted that embodiments presented herein may be used for many purposes, including but not limited to personal transportation, exercise and leisure and enjoyment. Personal transportation device 10 comprises several interconnected assemblies that together form a vehicle that the user can propel using his or her hands and steer using her feet. More particularly, personal transportation device 10 comprises platform assembly 20, steering mechanism 30, one or more wheel assemblies 23, 25, drive wheel assembly 50 and one or more track arm assemblies 62a, 62b. Track arm assemblies 62a, 62b are coupled to drive wheel assembly 50 via a drive wheel frame 52 so that movement of the track arms rotates drive wheel 54 to propel the vehicle 10. Drive wheel assembly 50, in turn, is coupled to platform assembly 20 by a platform frame 22. As discussed in more detail herein, wheel assemblies 40 are operatively connected to the bottom surface of platform assembly 20.

Turning to FIGS. 3-5B, embodiments of a drive wheel assembly 50 will now be described. Drive wheel assembly 50 includes a drive wheel 54 rotatably coupled to axle 56. The drive wheel 54 may be any type of tire that can support the weight of the device and the user. A tire from a bicycle measuring about twenty inches in diameter fits well with the device. Drive wheel 54 is operatively connected to drive sprocket 58 via chain 53 so that circular rotation of the drive sprocket 58 turns the chain 53 and imparts torque to drive wheel 54 via a smaller drive wheel sprocket 55, causing the drive wheel 54 to rotate about axle 56. The dimensions of drive sprocket 58 and drive wheel sprocket 55 may vary, and in exemplary embodiments the drive sprocket 58 is about seven inches in diameter and the drive wheel sprocket is about three inches in diameter. Drive sprocket 58 is located generally above drive wheel 54 with chain 53 generally vertically oriented between the drive wheel 54 and drive sprocket 58.

Each crank arm 57 is fixedly coupled to drive sprocket 58, which is, in turn, secured to crank arm axle 155 so that drive sprocket 58 can rotate about crank arm axle 155 when the crank arms 57 are actuated. Crank arm axle 155 is secured and through hub 157, which may be comprised of ball bearings. As discussed in more detail herein, this generally vertical orientation is beneficial for operation of the personal transportation device 10 because the force to propel the device originates from the hands and arms of a user in a standing position. While the distance between the center of drive sprocket 58 and the center of drive wheel sprocket 55 may vary, in exemplary embodiments this distance is about sixteen inches. It should be noted that embodiments of personal transportation device 10 could be a single speed device having one sprocket or could use multiple sprockets to allow for multiple speeds and resistance variations. Multiple speed embodiments would include drive gears employed as used on multiple speed bicycles.

Figure 3:
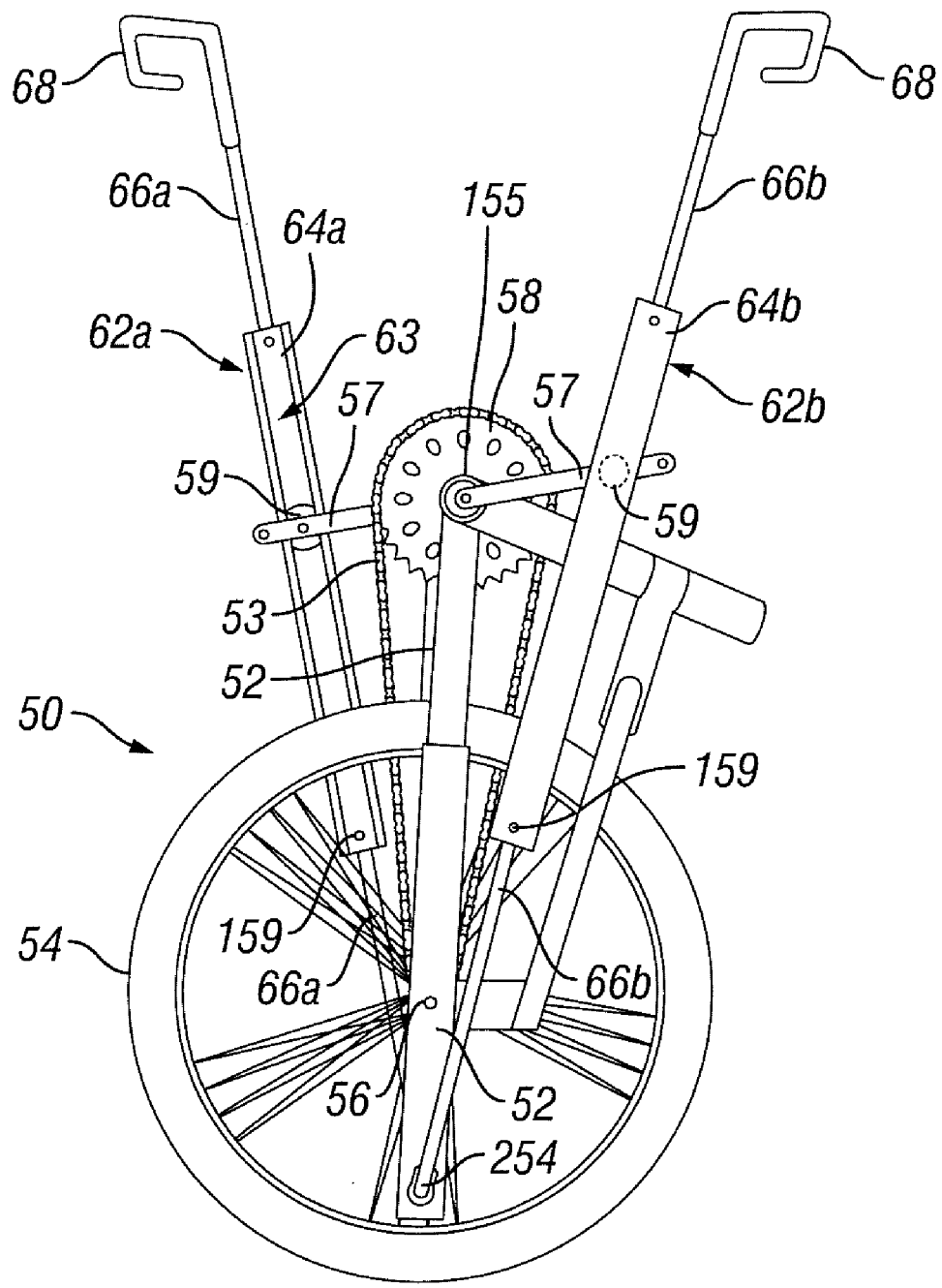
FIG. 3 is a side view of an embodiment of a drive wheel assembly and track arms of a personal transportation device in accordance with the present invention.
Figure 4:
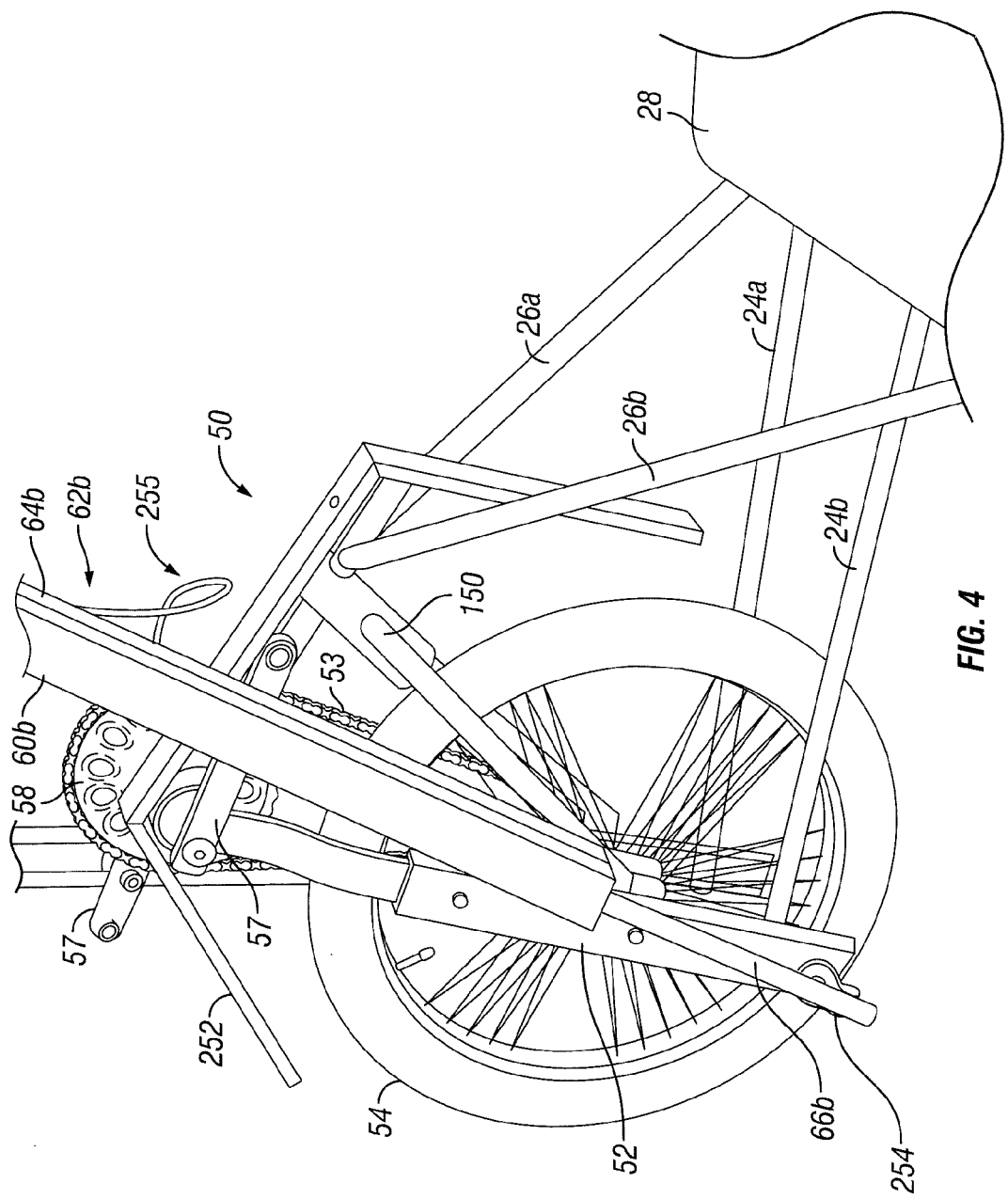
FIG. 4 is a perspective view of an embodiment of a drive wheel assembly of a personal transportation device in accordance with the present invention.
Figure 8:
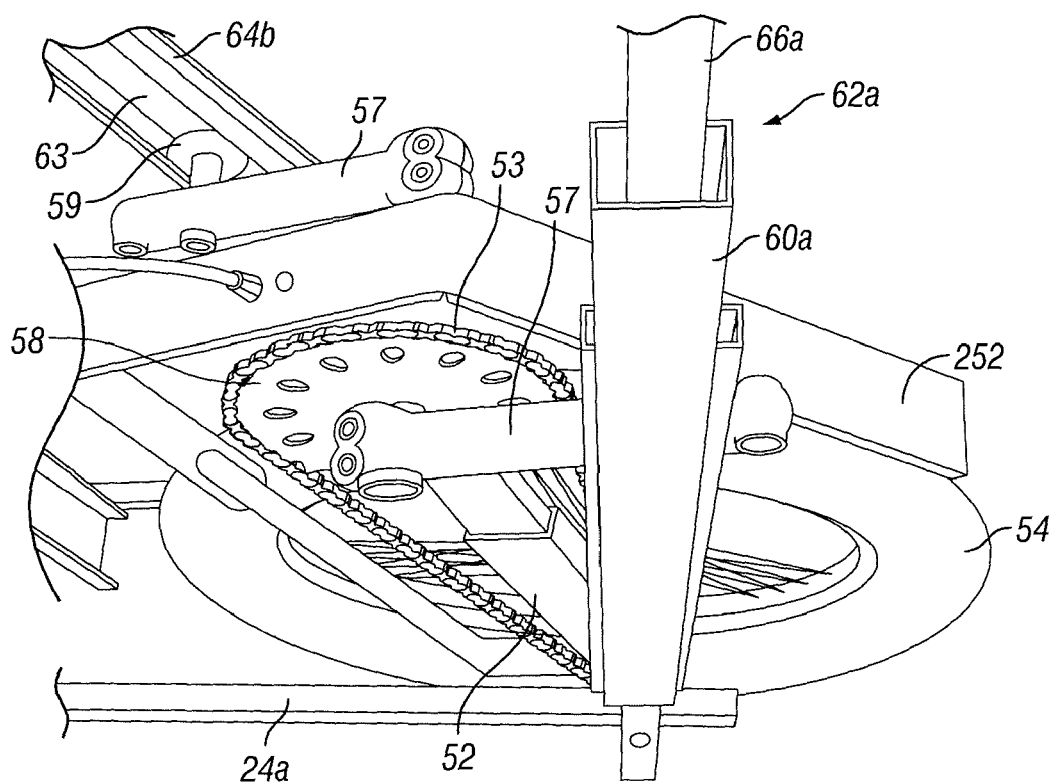
FIG. 8 is a perspective view of an embodiment of a track arm in relation to a drive wheel assembly in accordance with the present invention.

Track arm assemblies 62 may be configured in a number of different ways so long as they can be hand operated to drive the vehicle. They may be adjustable in height to accommodate different riders. In FIG. 3, for example, it can be seen that track arm assemblies 62a and 62b each comprise a track arm 66a, 66b and a track 64a, 64b coupled thereto. Each track arm 66a, 66b is coupled to a drive wheel frame 52 at or near the bottom of the track arm 66. An alternative arrangement of track arm assembly 62 that is height adjustable can be seen, for example, in FIG. 8. Track arm assemblies 62a, 62b each comprise a track arm 66a, 66b, a track 64a, 64b and a track arm frame member 60a, 60b. Track arm frame member 60 defines a hollow interior and is coupled to each track arm 66a, 66b such that each track arm 66a, 66b extends through a respective track arm frame member 60a, 60b. A track 64a, 64b is fixedly attached to one side of each respective track arm frame member 66a, 66b. Operation of track arm assemblies 62a, 62 for height adjustment and driving the vehicle is described in detail herein.

Track arm assemblies 62a and 62b are coupled to the drive wheel assembly 50 via drive wheel frame 52. More particularly, drive wheel frame 52 extends on either side of the wheel assembly 50. An additional angled frame member 150 extends generally diagonally and rearwardly and, at its top, is fixedly attached to platform frame assembly 22. At its bottom, each track arm 66a, 66b is pivotally coupled to one side of drive wheel frame 52 at or near the bottom of the drive wheel frame 52 via a ball bearing caster piece 254 or other suitable pivotable fastener. Each track arm 66a, 66b pivots on the ball bearing caster piece 254. The top of drive wheel frame 52 is fixedly attached to crank arm axle 155 such that the drive wheel frame 52 forms a rigid support for drive wheel assembly 50. Drive wheel frame 52 is also fixedly attached to axle 56 for further support.

In exemplary embodiments drive wheel 54 is not steerable, but rather rotates about axle 56 in a fixed, straight position. A fender component 252 may optionally be attached to the drive wheel frame 52 above hub 157. An additional swing wheel assembly 169 may be affixed to the bottom of one or both track arms 66a, 66b to improve maneuverability for storage purposes and for turning the vehicle. The rider pulls the gripping handles 68 down until swing wheel assembly 169 touches the ground and then the rider will be able to easily swing the vehicle to the right or left.

As best seen in FIGS. 2-3, the location of pivot point 254 at which the track arm 66 is coupled to drive wheel frame 52 is at or near the bottom of the drive wheel 54 very close to the ground or riding surface. This low pivot point at the bottom of the track arm 66a, 66b allows for an advantageous distance of about 24 inches between the top ends of the track arm assembly gripping handles 68. It also allows for an advantageous distance of about five inches between the center of hub 157 and the center of rollers 59 as each roller is disposed in the track 64 of a respective track arm assembly 62. Thus, the total distance between the center of each roller 59 is about ten inches so the rollers rotate about a 10-inch diameter. In exemplary embodiments, the distance from the center of hub 157 to the center of rollers 59 may vary between about 4 inches and about 7 inches, and a 5½ inch distance also works well. Crank arms 57 may be constructed of any suitable material, tubular or solid metal could be used. The pivot point is at caster bearing 254 or any other suitable pivoting fastener.

As discussed above, embodiments of track arm assemblies 62 comprise tracks 64a, 64b coupled to each respective track arm 66a, 66b. At the top of each respective track arm 66a, 66b is a gripping handle 68. More particularly, gripping handles 68 are the top of track arms 66, which extend down to the bottom of the wheel 54. Gripping handles 68 may take many forms, such as straight handles, circular or squared handles, or other curved or S-shaped handles, so long as the user can grip the handles and move the track arms. The gripping handles could be made of any material of suitable strength that is still maneuverable. Round iron piping having an outer diameter between about ¼ inch and 2 inches may be used, with exemplary embodiments employing ¾ inch pipe. The length of the pipe may vary considerably, and exemplary embodiments use pipe having a length of between about 40 and 45 inches with a roughly 90 bend at the top and extending between about 5-8 inches for a hand grip portion. The gripping material may be foam, rubber, latex or any other material suitable for gripping. In exemplary embodiments, gripping handles 68 may be adjusted up and down so they are at a comfortable height for the rider. This feature allows riders of different heights to customize the gripping handles for optimal comfort and maneuverability.

Figure 7C:
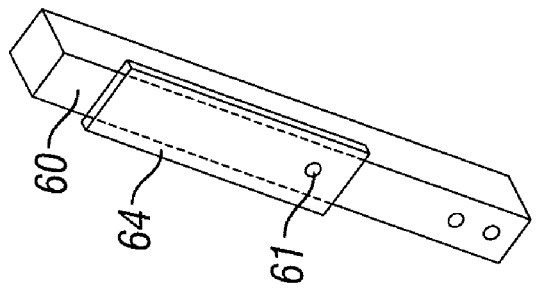
FIGS. 7A-7C are schematics of an embodiment of a track arm in accordance with the present invention.
Figure 7B:
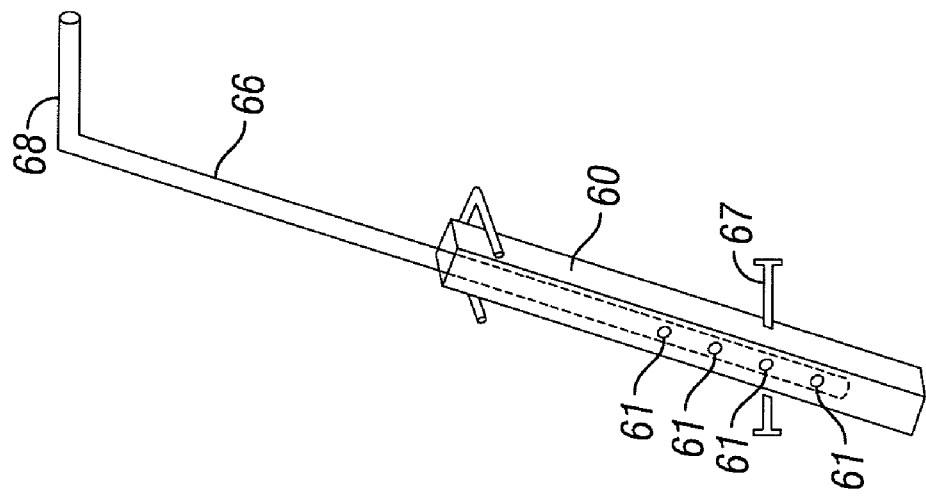
Figure 7A:
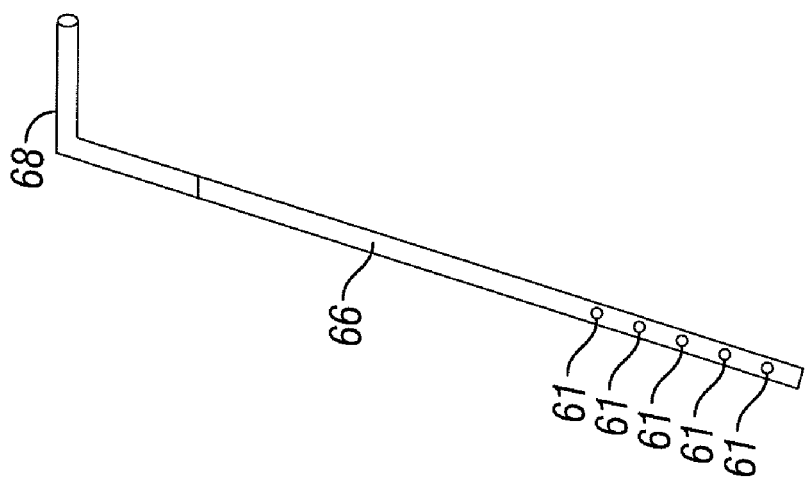

As best seen in FIGS. 7A-7C, in adjustable track arm assemblies 62, track arm frame members 60a, 60b define a plurality of height adjustment holes 61, which are through holes drilled through track arm frame members 60. The distance between height adjustment holes 61 may vary considerably, but 4-6 holes with a 3-inch distance between holes provides a good range of adjustable height to accommodate most riders. Each track arm 66a, 66b is sized to slip down within an a respective track arm frame member 60a, 60b, which may be coupled to track 64 by a U-bolt assembly 158 or other suitable fastener. Alternatively, track 64 and track arm frame member 60 may be welded together. In certain embodiments, the track arm frame member 60 may extend to the bottom of drive wheel assembly 50 and be attached to drive wheel frame 52 by ball bearing caster piece 164 or other suitable pivoting fastening mechanism. Track arm frame member 60 may be between about 34 and 38 inches in length and have an internal diameter of between about ½ inch and one inch.

To adjust the height of gripping handles 68, the rider first removes through bolt 67 from the height adjustment hole 61 it is in and slides the gripping handles 68 and track arms 66 up or down to the desired height. Then the rider inserts the through bolt in the appropriate height adjustment hole 61 so the through bolt 67 fits through both track arm frame members 60 and track arms 66, thus locking gripping handles 68 in place at the desired height. In addition to its role in height adjustment, track arm frame member 60 serves to add stability to track arm 66.

Figure 9:
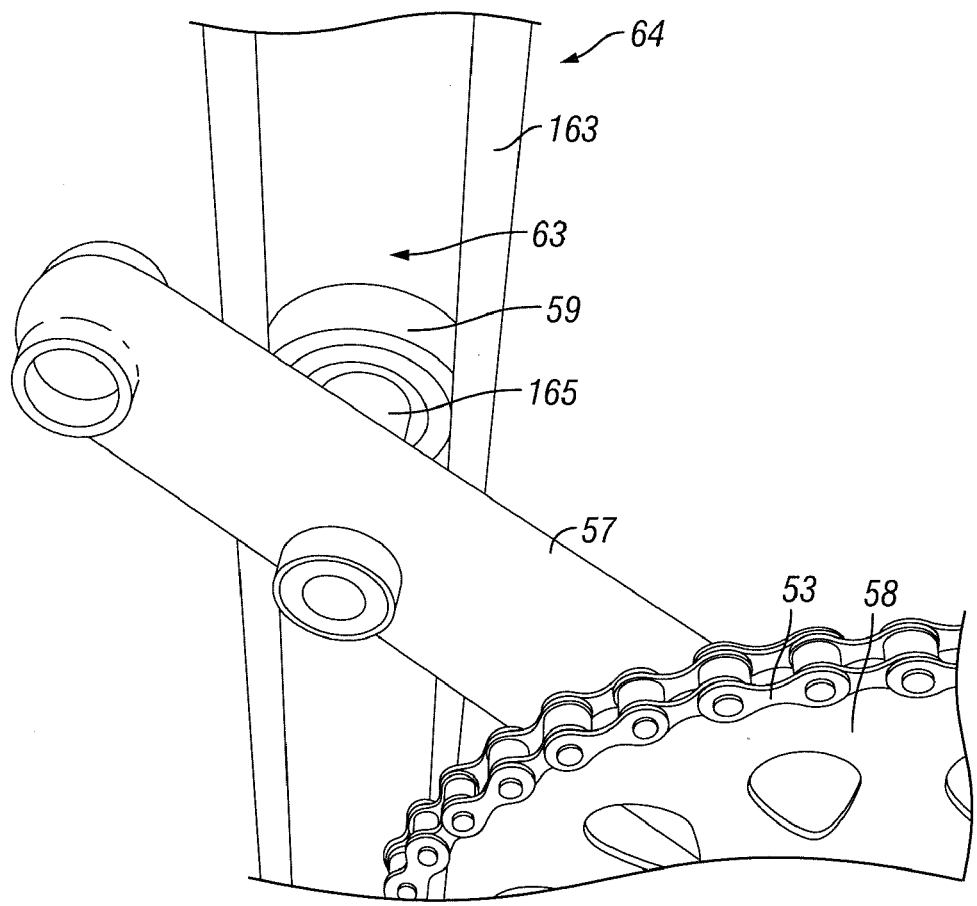
FIG. 9 is a perspective view of an embodiment of a crank arm and roller in accordance with the present invention shown coupled to a track arm.
Figure 10B:
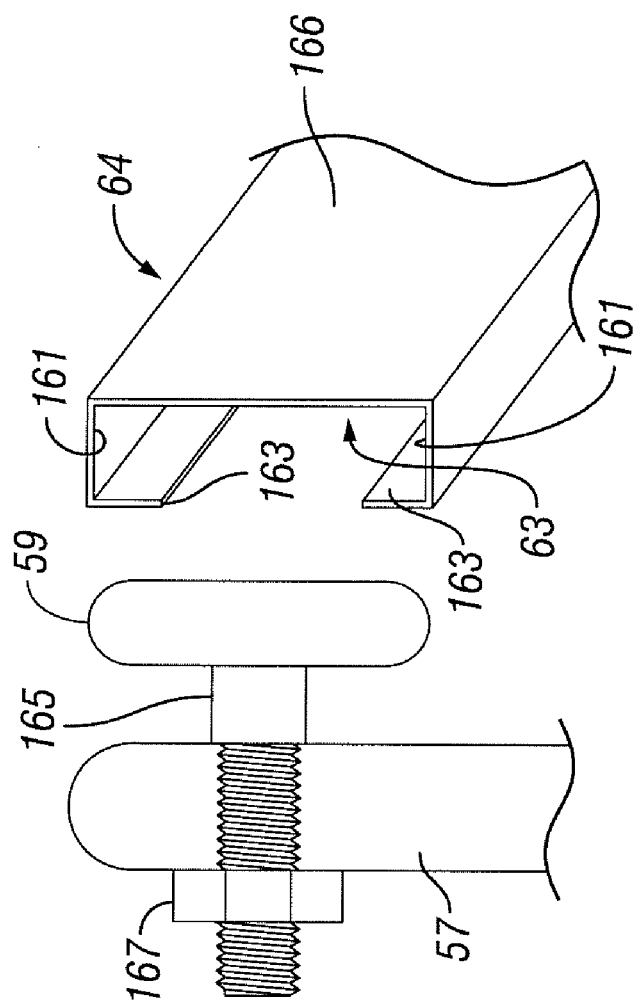
FIG. 10B is a schematic of an embodiment of a crank, roller and track in accordance with the present invention.
Figure 10A:
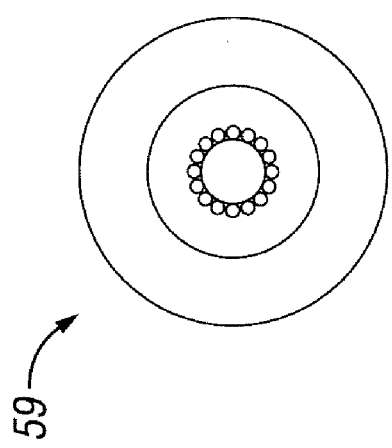
FIG. 10A is a schematic of an embodiment of a roller in accordance with the present invention.

Track arm assemblies 62a, 62b and their interoperability with crank arms 57 and rollers 59 will now be described in more detail with reference to FIGS. 9 and 10A-10B. Each track arm assembly 62a, 62b comprises a track 64a, 64b that defines a channel 63 extending along the length of the track 64a, 64b and has a back surface 166 of about ⅕ to 2.5 inches in width, two side walls 161 of about ¼ inch to ¾ inches in height and two flanges 163 to secure roller 59 within the channel 63. The channel 63 of track 64 faces inward toward drive sprocket 58 and crank arms 57. In exemplary embodiments, the track 64 is made of stainless steel and is between about twenty and twenty-five inches in length, but the materials and length may vary. The channel 63 of each track 64 is sized to receive roller 59 such that the roller 59 can ride through the channel 63 in track 64 by rolling along side walls 161. Roller 59 is rotatably coupled to a roller shaft 165 that is threaded or pressed so that it extends through crank arm 57 and is secured thereto by lock nut 167. Alternatively, each roller 59 may be installed directly into an existing hole in each crank arm 57 that was intended for attaching a bicycle pedal. This alternate configuration makes the crank arm shaft and crank arm 57 all one piece. The roller 59 may be any wheel of suitable size and strength. Exemplary rollers are ball bearing rollers between about 1.5 and 2.5 inches in diameter, so long as the diameter corresponds to the track width. Roller width should be about the same as or slightly smaller than the width of the track side walls. Rollers may be coated with materials to facilitate smooth rolling such as nylon. The track 64 should be a strong but lightweight material such as, e.g., stainless steel, aluminum, plastics, composites or metal alloys.

Figure 5B:
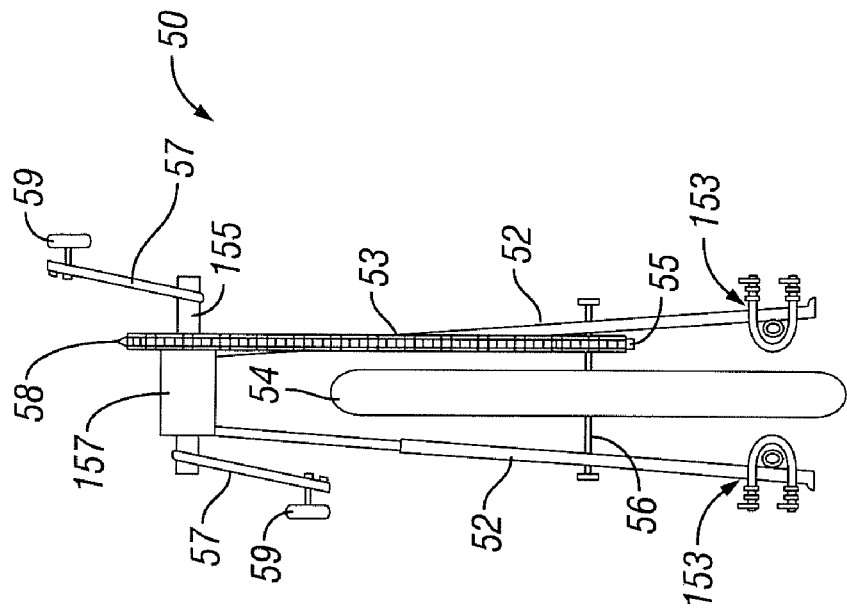
FIG. 5B is a front view of the drive wheel assembly of FIG. 6A.
Figure 5A:
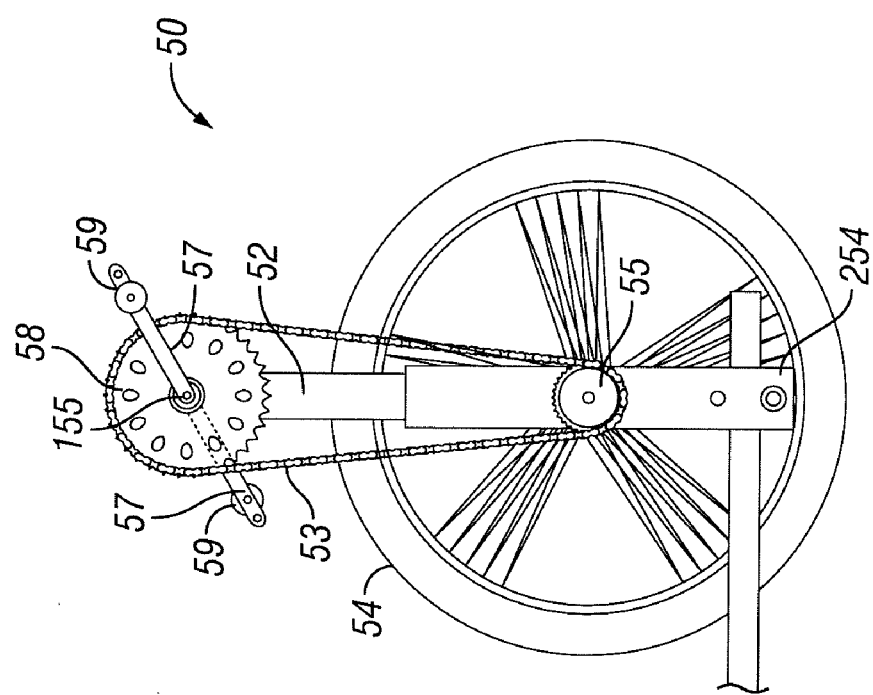
FIG. 5A is a side view of an embodiment of a drive wheel assembly of a personal transportation device in accordance with the present invention.
Figure 12A:
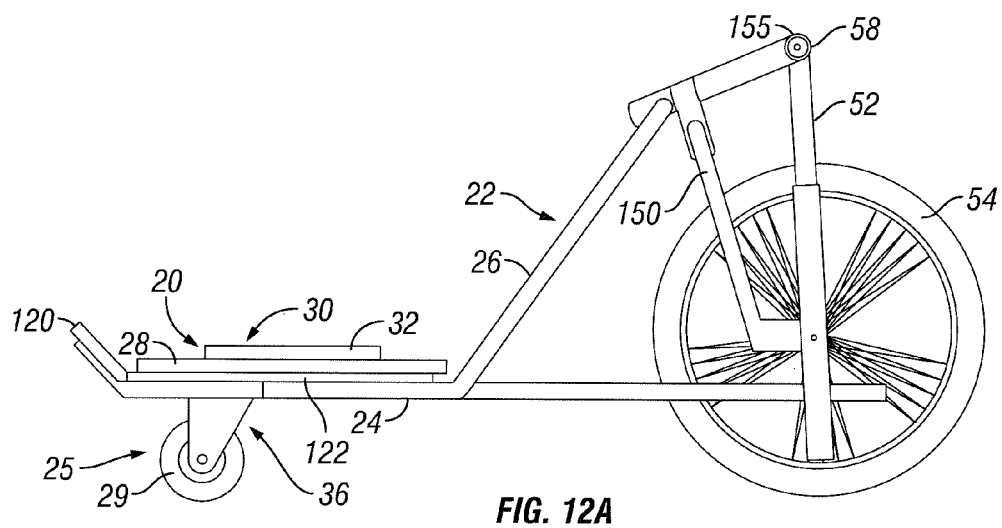
FIG. 12A is a side view of an embodiment of a personal transportation device in accordance with the present invention showing a frame assembly and a platform assembly.
Figure 12B:
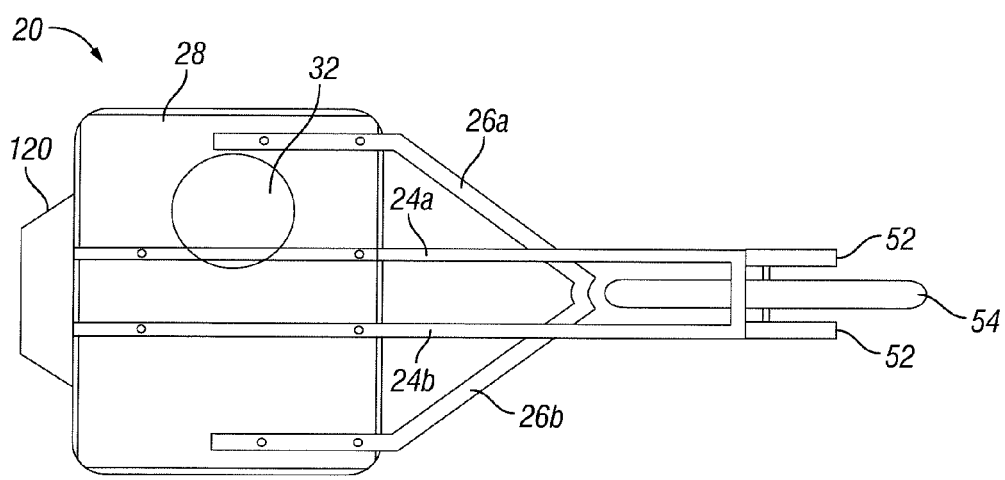
FIG. 12B is a bottom view of an embodiment of a personal transportation device in accordance with the present invention showing a frame assembly and a platform assembly.
Figure 17:
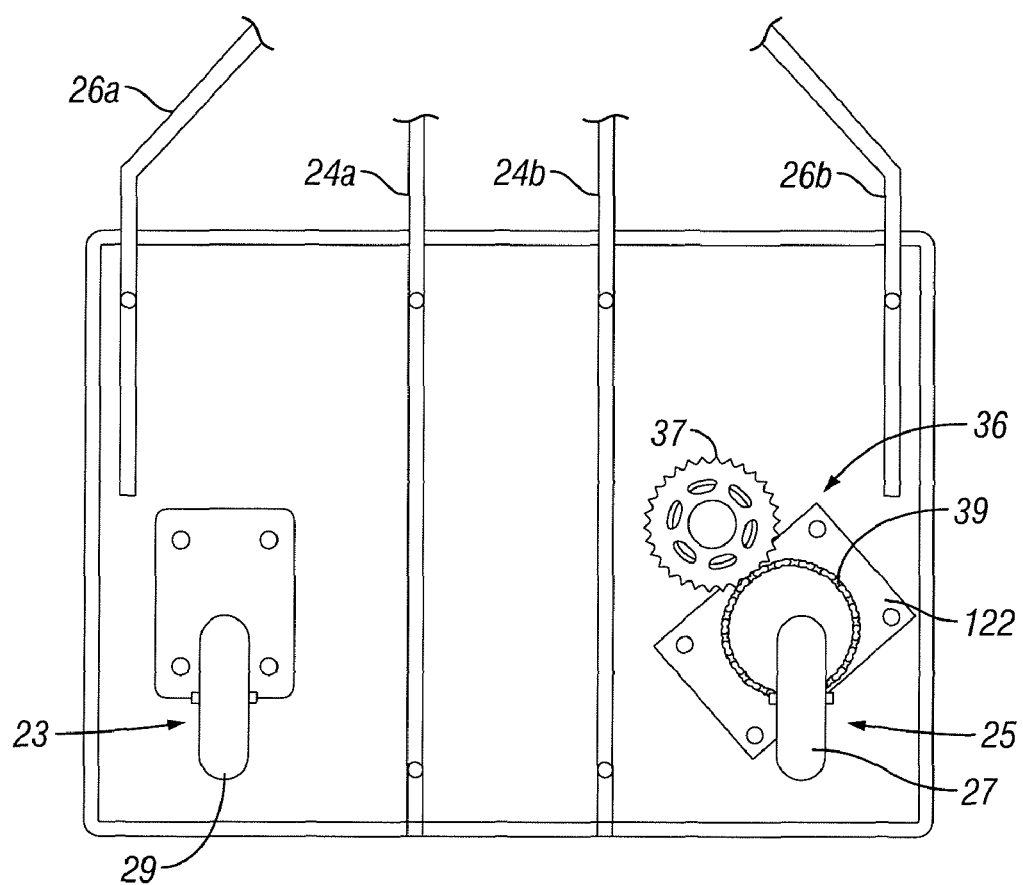
FIG. 17 is a bottom view of an embodiment of a platform in accordance with the present invention showing two wheel assemblies and a portion of a steering mechanism.
Figure 18:
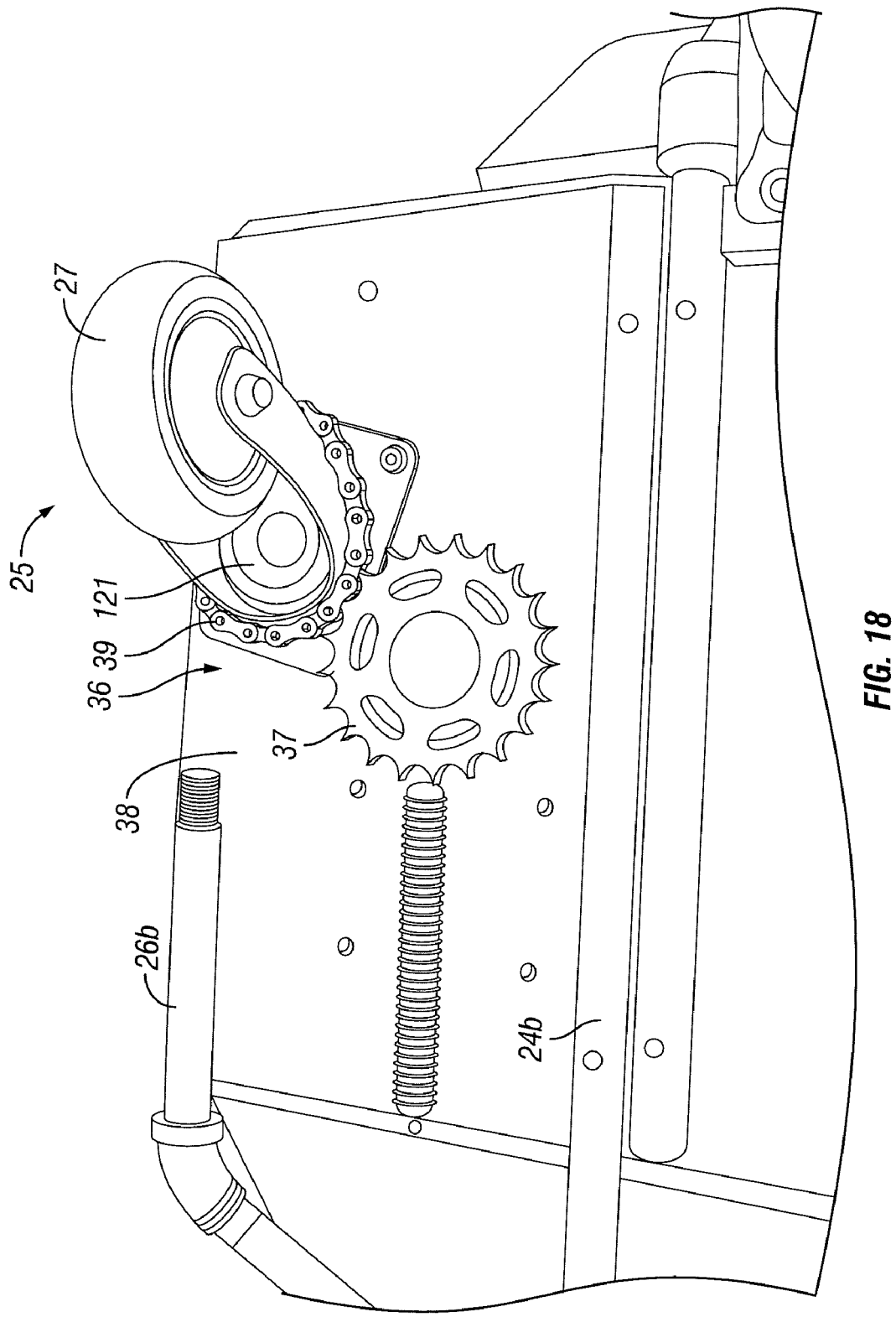
FIG. 18 is a perspective view of a wheel assembly and a portion of a steering mechanism in accordance with the present invention.
Figure 19:
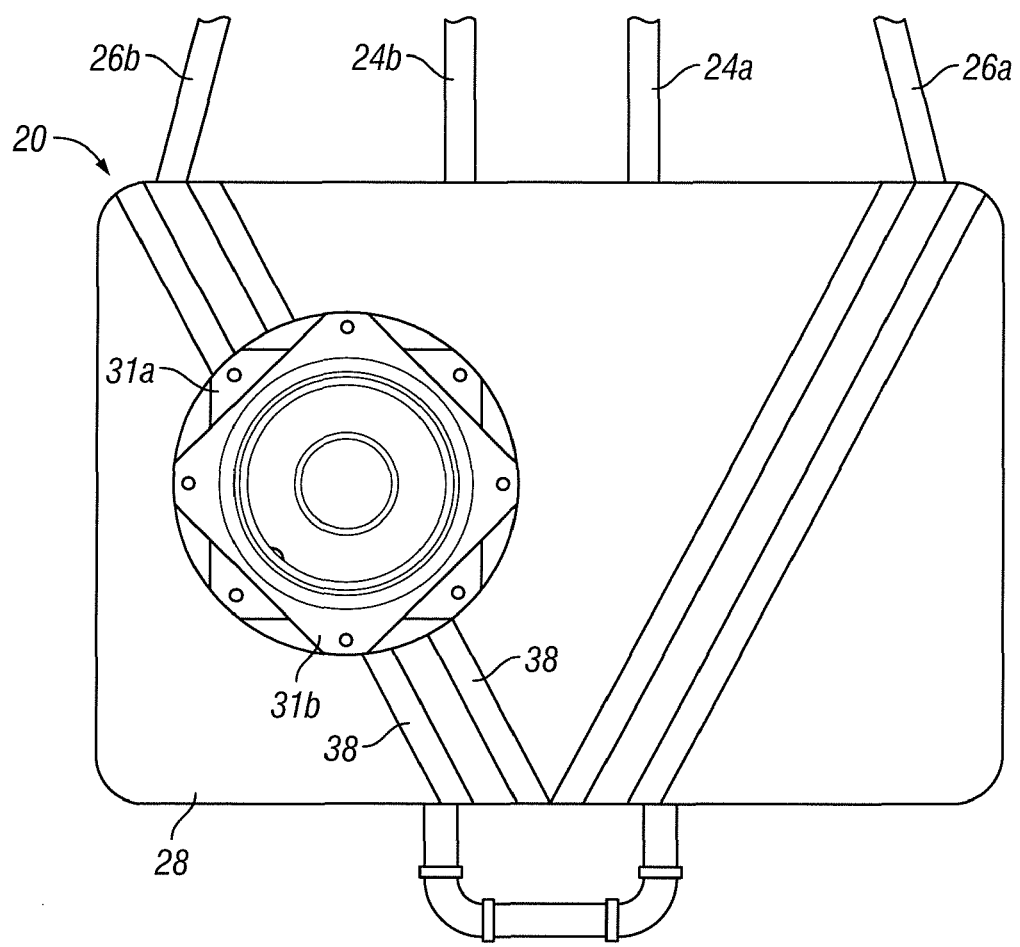
FIG. 19 is a top perspective view of a platform in accordance with the present invention showing some internal components of a steering assembly in accordance with the present invention, including cabinet bearings.
Figure 20:
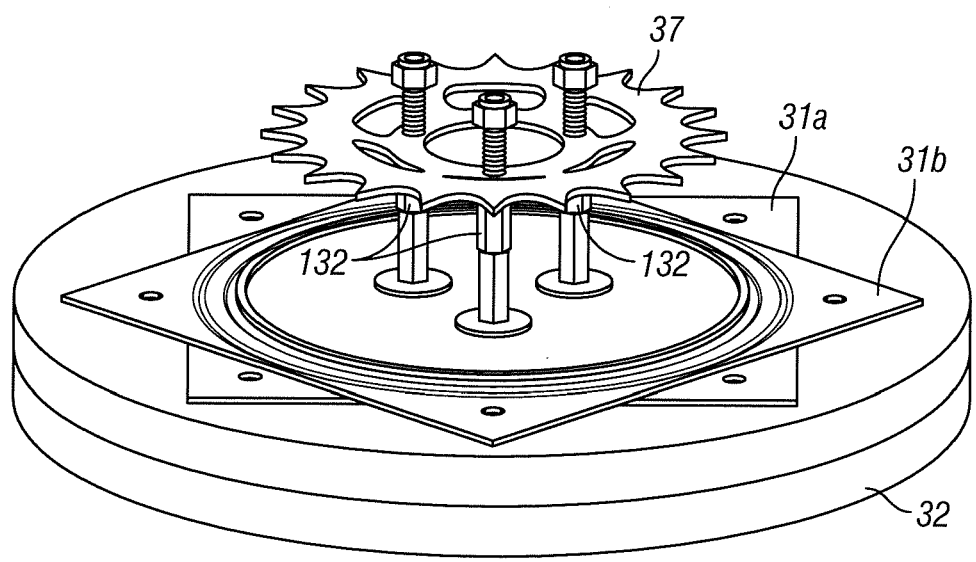
FIG. 20 is a perspective view of components of a steering assembly in accordance with the present invention, including cabinet bearings, long bolts and a gear.

Referring to FIGS. 11-12B, the interconnection of the drive wheel assembly 50 and platform assembly 20 will now be described. Platform frame 22 serves to couple drive wheel assembly 50 to platform assembly 20 by two connection mechanisms. In an exemplary embodiment, platform frame 22 comprises two platform frame members 24a, 24b and two stabilizing bars 26a, 26b. At one end the platform frame members 24 are fixedly attached to the bottom of platform assembly 20, for example as shown in FIG. 17, and extend to drive wheel frame 52. At an opposite end, each platform frame member 24a, 24b is fixedly attached to a respective drive wheel frame 52 by a suitable fastening mechanism. Exemplary embodiments utilize a U-bolt 153, as shown in FIG. 5b. Alternatively, instead of platform frame member 24 being substantially straight, it may be a component having an acute angle so that it attaches to an attachment point on angled frame member 150 of drive wheel frame 52.

As best seen in FIG. 17, stabilizing bars 26a, 26b are fixedly attached, for instance by bolts, to the bottom of platform 28. Stabilizing bars 26a, 26b extend substantially diagonally upwards in relation to the ground to an attachment point on the angled frame member 150 of drive wheel frame 52, where the stabilizing bars 26a, 26b are fixedly attached to the angled frame member 150 with a U-bolt and clamp assembly or any other suitable fastening mechanism. The U-bolt attachment mechanism allows the rider to easily adjust the angle of the drive wheel 54 by loosening the bolts and sliding the drive wheel back and forth in position on the two lower pipes. The range of adjustment could be up to about six inches. In addition, in some embodiments stabilizing bars 26a, 26b may be configured so that the location of the drive wheel assembly may be adjusted up and down.

The platform assembly 20 and steering mechanism 30 will now be described with reference to FIGS. 13-18. Platform assembly 20 comprises platform 28 and steering mechanism 30. Platform 28 is a substantially flat component that provides a surface for the rider to stand on during operation of the exercise apparatus 10. It may be any shape, including but not limited to, square, circular, ovular, and in exemplary embodiments is a substantially rectangular component. Platform 28 may be rounded at its corners to reduce risk of injury to the rider and pedestrians. The dimensions of platform 28 may vary, and exemplary embodiments are between 20 and 24 inches in length and between 12 and 16 inches in width. Kick plate 120 may be movably coupled to the back of platform 28 so the rider can shift his weight back onto the kick plate 120 to lift the front of the exercise apparatus 10 off of the ground and make turning easier. Kick plate 120 may be disposed at an angle in relation to platform 28, e.g., a forty-five degree angle in exemplary embodiments and may have a length of between about 9-12 inches and a width of between about 3-5 inches.

The platform 28 is supported by one or more wheel assemblies 23 operatively attached to the bottom of the platform 28. Exemplary embodiments comprise two wheel assemblies such that a first wheel assembly 23 includes a slave wheel 29 and a second wheel assembly 25 includes a steerable wheel 27. The wheels may vary in size and be made of different materials depending on the desires of the rider. Exemplary embodiments use wheels made of soft rubber approximately four inches in diameter. In exemplary embodiments, slave wheel 29 is a caster type wheel that can spin around 360 degrees.

Figure 16:
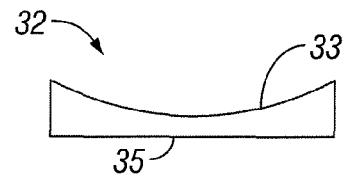
FIG. 16 is a cross-section view of an embodiment of a steering mechanism in accordance with the present invention.

Platform 28 defines a substantially round hole 21 in which disk 32 of steering mechanism 30 is partially embedded. As best seen in FIG. 16, disk 32 has a concave top surface 33 and a substantially flat bottom surface 35. As described in more detail herein, one foot of the rider is placed on the concave top surface 33 of the disk 32 during operation of the exercise apparatus 10. The concave surface 33 is formed such that the left and right sides of the disk 32 slope upward for better traction. Steering mechanism 30 extends through the hole 21 and includes a user interface 34 accessible from the top of platform 28 and a turning assembly 36 accessible from the bottom of the platform 28. In exemplary embodiments, the user interface 34 is the top surface of disk 32.

Figure 13:
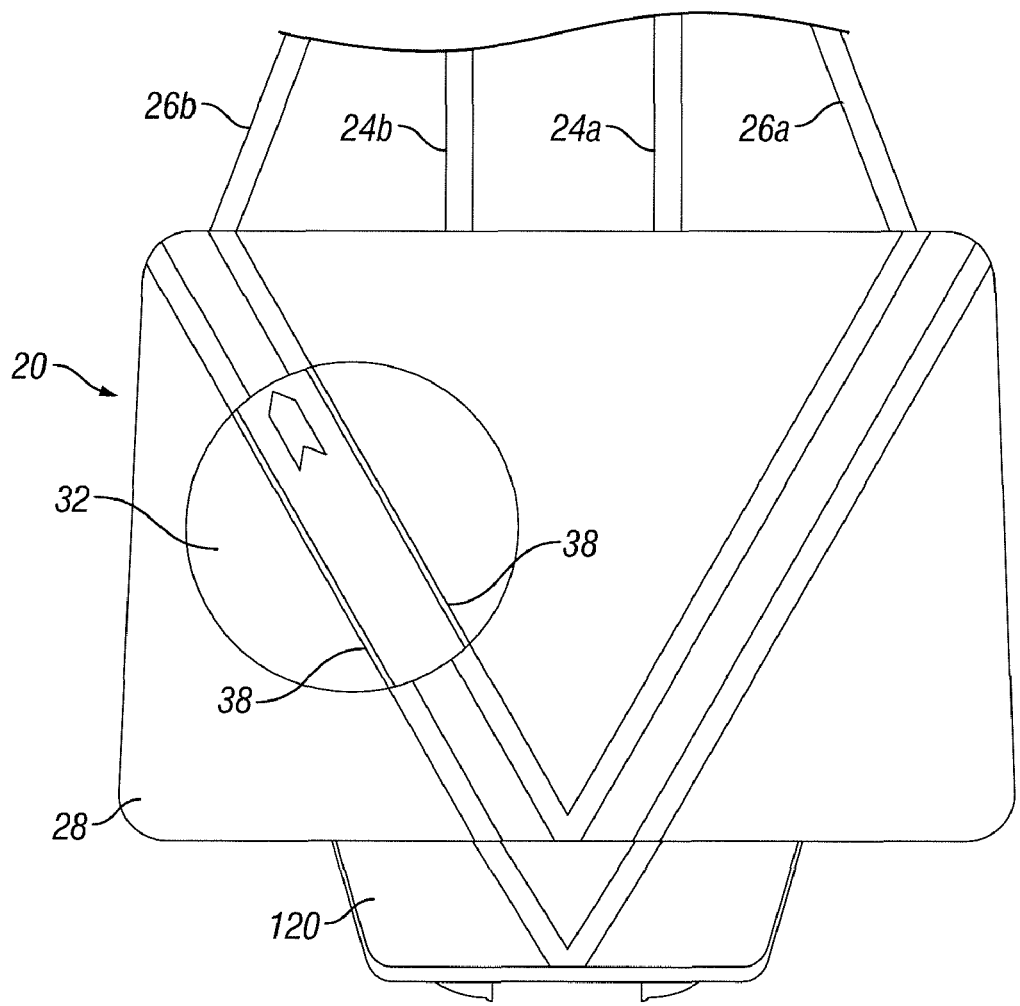
FIG. 13 is a top view of an embodiment of a platform assembly and steering mechanism in accordance with the present invention showing the steering mechanism turned to the left.
Figure 14A:
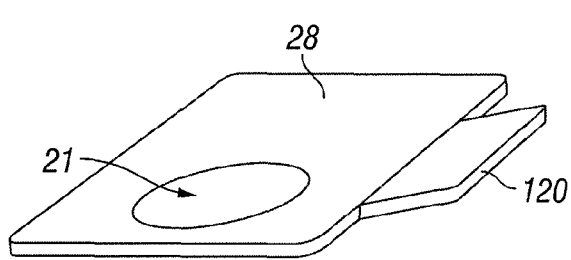
FIG. 14 is a perspective view of an embodiment of a platform in accordance with the present invention.
Figure 14B:
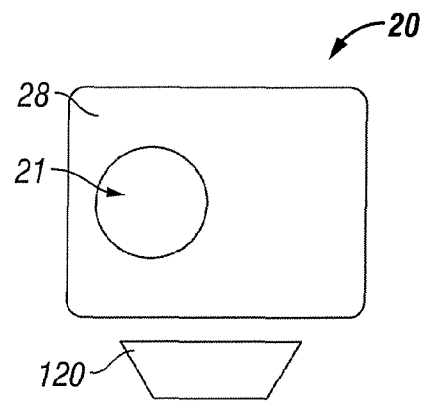

The disk 32 may be of any size that can accommodate the foot of a rider, and in exemplary embodiments has a diameter of between about seven and ten inches, a height of between about one inch and 1½ inches at its edges and a height of between about ¼ inch and ¾ inch in the center. In exemplary embodiments, the center of the disk 32 protrudes above the top surface of the platform 28 by about ⅛ inch. Disk 32 may have one or more orientation lines 38 to indicate to the user the direction of steerable wheel 27. As best seen in FIG. 13, orientation lines 38 may extend toward the front left corner of the vehicle and generally diagonal to the vehicle layout to indicate a straight orientation. In particular, the steerable wheel 27 and turning assembly 36 may be configured so that the vehicle goes straight when the rider's left foot is pointed slightly outward, which is a comfortable riding position. In other words, the diagonal orientation of the lines 38 indicates a straight direction of the vehicle 10. The orientation lines may extend in different directions during turning operation, such as more leftward to indicate a leftward orientation. As seen in FIG. 13, orientation lines 38 may be part of a design on the platform 28.

The steering mechanism and turning assembly can be any appropriate system that can be utilized to turn the steerable wheel 27 in conjunction with disk 32, including any suitable configuration of gears, opposing gears or levers. As seen in FIGS. 17-20, an exemplary embodiment of turning assembly 36 includes cabinet bearings 31, interlocking gear 37 and a steering chain 39 mounted on ball bearing 121. The turning assembly operatively links steering mechanism 30 to the steerable wheel assembly 25. More particularly, steering gear 37 is operatively connected to the bottom surface 35 of disk 32. The steerable wheel assembly 25 includes a ball bearing 121 attached to a sub-base 122 by any suitable mechanical fasteners. Steering chain 39 is mounted on ball bearing 121 and operatively connected to steering gear 37 so the rider can steer wheel 27 by manipulating the steering mechanism 30. A first swivel cabinet bearing plate 31a is attached to the bottom of disk 32, and a second swivel cabinet bearing plate 31b is attached to the top of sub-base 122. The cabinet bearings 31 can range in diameter from about four inches to about 10 inches, and exemplary embodiments use 6-inch or 9-inch diameter cabinet bearings. Cabinet bearings 31a, 31b facilitate ease of rotation of disk 32. Chain 39 rests on ball bearing 121, and gear 37 is secured to the bottom surface 35 of disk 32 via long bolts 132. As best seen in FIG. 17, gear 37 and chain 39 are located so they interact to turn wheel 27.

In operation, the rider mounts hand-propelled vehicle 10 by stepping onto platform 28 and placing her hands on gripping handles 68 of track arms 66. To propel the vehicle 10 forward, the rider exerts force on the gripping handles 68, alternately moving right track arm assembly 62a and left track arm assembly 62b forward and backwards. More particularly, track arms 66a, 66b are moved such that when the right track arm 66a is in a forward position away from the rider the left track arm 66b is in a backward position close to the rider and vice versa. These opposed forward and backward motions of the track arm assemblies 62a, 62b engage crank arms 57 and rollers 59. The rollers 59 ride in channel 63 of each respective track 64a, 64b and crank arms 57 rotate drive sprocket 58 about crank arm axle 155. Drive sprocket 58 engages chain 53, which moves about drive sprocket 58 at one end and a smaller drive wheel sprocket 55 at another end. The rotation of drive sprocket 58 turns the chain 53, which rotates drive wheel sprocket 55 and causes wheel 54 to rotate about its axis so the vehicle is propelled forward. To stop the forward motion of the hand-propelled vehicle 10, the rider squeezes brake handle 156 so that brake system 255 engages the rim of the wheel 54 to stop its forward rotation.

Figure 15:
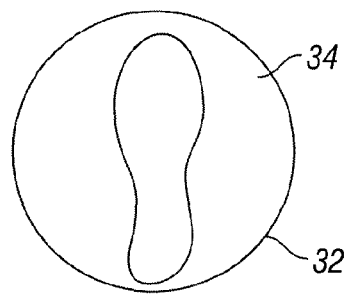
FIG. 15 is a schematic of a top surface of an embodiment of a steering mechanism in accordance with the present invention.

To steer the hand-propelled vehicle 10, the rider places his foot on disk 32 of the steering mechanism 30. More particularly, as shown in FIG. 15 the rider puts his foot on the concave top surface 33 of the disk 32. If the rider wishes to turn the vehicle 10 to the left, the rider turns his foot to point it to the left, thereby rotating the disk 32. The rider simply turns his foot in the direction he wants to go. When the disk 32 is turned by the rider standing on top of the platform 28, it activates the steering mechanism 30 and engages turning assembly 36 on the bottom of the platform 28 to turn steerable wheel assembly 25. More particularly, when disk 32 turns it rotates cabinet bearings 31a, 31b, which, in turn, rotate gear 37. Gear 37 has an interlocking engagement with chain 39 so that its rotation causes chain 39 to rotate. Because chain 39 rests on ball bearing 121, the ball bearing then rotates to steer wheel 27. Due to the engagement of gear 37 and chain 39, a leftward turn of disk 32 by the rider will result in steer wheel 27 shifting to the right to steer the vehicle 10 to the left. While operating the steering mechanism 30 with the left foot, the rider may place the right foot on kick plate 120 and shift some weight to the right foot to lift the front of the vehicle, particularly the drive wheel 154 off the ground to increase maneuverability.

Thus, it is seen that a personal transportation apparatus is provided. While embodiments of the invention have been described above, it will be apparent to one skilled in the art that various changes and modifications may be made. It should be understood that any of the foregoing configurations and specialized components may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover all such changes and modifications that fall within the true spirit and scope of the invention.

What is claimed is:

1. A hand-propelled vehicle comprising:
   a platform assembly having a platform and a steering mechanism coupled to the platform, the steering mechanism including a user interface accessible from a top surface of the platform and a turning assembly accessible from a bottom surface of the platform, the turning assembly having an interlocking gear and chain;
   one or more wheel assemblies, each wheel assembly having a wheel, at least one wheel assembly being operatively connected to the steering mechanism;
   a drive wheel assembly including a drive wheel operatively connected to a drive sprocket and chain, the drive wheel assembly coupled to the platform assembly by a platform frame; and
   a pair of track arm assemblies coupled to a drive wheel frame such that movement of the track arms operates the drive wheel assembly and rotates the drive wheel to propel the vehicle.

2. The hand-propelled vehicle of claim 1 wherein the user interface is a substantially round disk.

3. The hand-propelled vehicle of claim 1 wherein the one or more track arm assemblies are operative by opposed forward and backward motions.

4. The hand-propelled vehicle of claim 3 wherein the one or more track arm assemblies comprise gripping handles.

5. The hand-propelled vehicle of claim 1 wherein the steering mechanism is foot-operated.

6. The hand-propelled vehicle of claim 1 wherein the at least one wheel assembly comprises two wheel assemblies, a first wheel assembly having a steerable wheel, a second wheel assembly having a slave wheel.

7. The hand-propelled vehicle of claim 1 wherein the one or more track arm assemblies are adjustable in height.

8. The hand-propelled vehicle of claim 1 wherein each track arm assembly comprises a track extending partially along the length of the track arm assembly.

9. The hand-propelled vehicle of claim 8 wherein the drive wheel assembly further comprises two crank arms, each crank arm having a first end and a second end, the first end of each crank arm being fixedly coupled to the drive sprocket and the second end of each crank arm being movably coupled to a respective track arm assembly via a roller disposed within a track.

10. The hand-propelled vehicle of claim 9 wherein the one or more track arm assemblies comprise a track arm frame member having a top and bottom portion and the drive wheel frame comprises a first end and a second end, the first end of the drive wheel frame being pivotally coupled to the bottom portion of the track arm frame member and the second end of the drive wheel frame being coupled to the drive sprocket and a crank arm.

11. A personal transportation device comprising:
    a riding platform supported by one or more wheels;
    a foot-operated steering mechanism at least partially embedded in the riding platform;
    a hand-propelled single non-steerable drive wheel; and
    a pair of track arm assemblies pivotally coupled to a drive wheel frame such that movement of the track arm assemblies rotates the drive wheel to propel the personal transportation device, the drive wheel frame including a first member coupled to a bottom of a track arm assembly and a second member having a first end and a second end, the first end of the second member pivotally coupled to the first member and the second end of the second member pivotally coupled to a drive sprocket and a crank arm;
    wherein the drive wheel is operatively connected to the drive sprocket and a chain and is coupled to the riding platform by a platform frame.

12. The personal transportation device of claim 11 wherein the steering mechanism comprises a user interface accessible from a top surface of the riding platform and a turning assembly accessible from a bottom surface of the platform.

13. The personal transportation device of claim 12 wherein one or more wheels comprise two wheels and the steering mechanism is operatively connected to one of the two wheels so that the wheel is steerable by manipulating the user interface of the steering mechanism.

14. The personal transportation device of claim 11 wherein a pivot point located where the first end of the second member is coupled to the first member is adjacent a bottom edge of the drive wheel.

15. An exercise apparatus comprising:
a riding platform supported by at least two wheels, a first wheel being steerable, a second wheel being a slave wheel;
a steering mechanism at least partially embedded in the riding platform;
a single non-steerable drive wheel; and
one or more hand-operable track arm assemblies pivotally coupled to a drive wheel frame such that movement of the track arm assemblies rotates the drive wheel to propel the vehicle system;
wherein the drive wheel is operatively connected to a drive sprocket and chain and is coupled to the riding platform by a platform frame.

16. The vehicle system of claim 15 wherein the steering mechanism comprises a user interface accessible from a top surface of the riding platform and a turning assembly accessible from a bottom surface of the platform.

17. The exercise apparatus of claim 15 wherein the drive sprocket is located above the drive wheel.

* * * * *